UNITED STATES PATENT OFFICE.

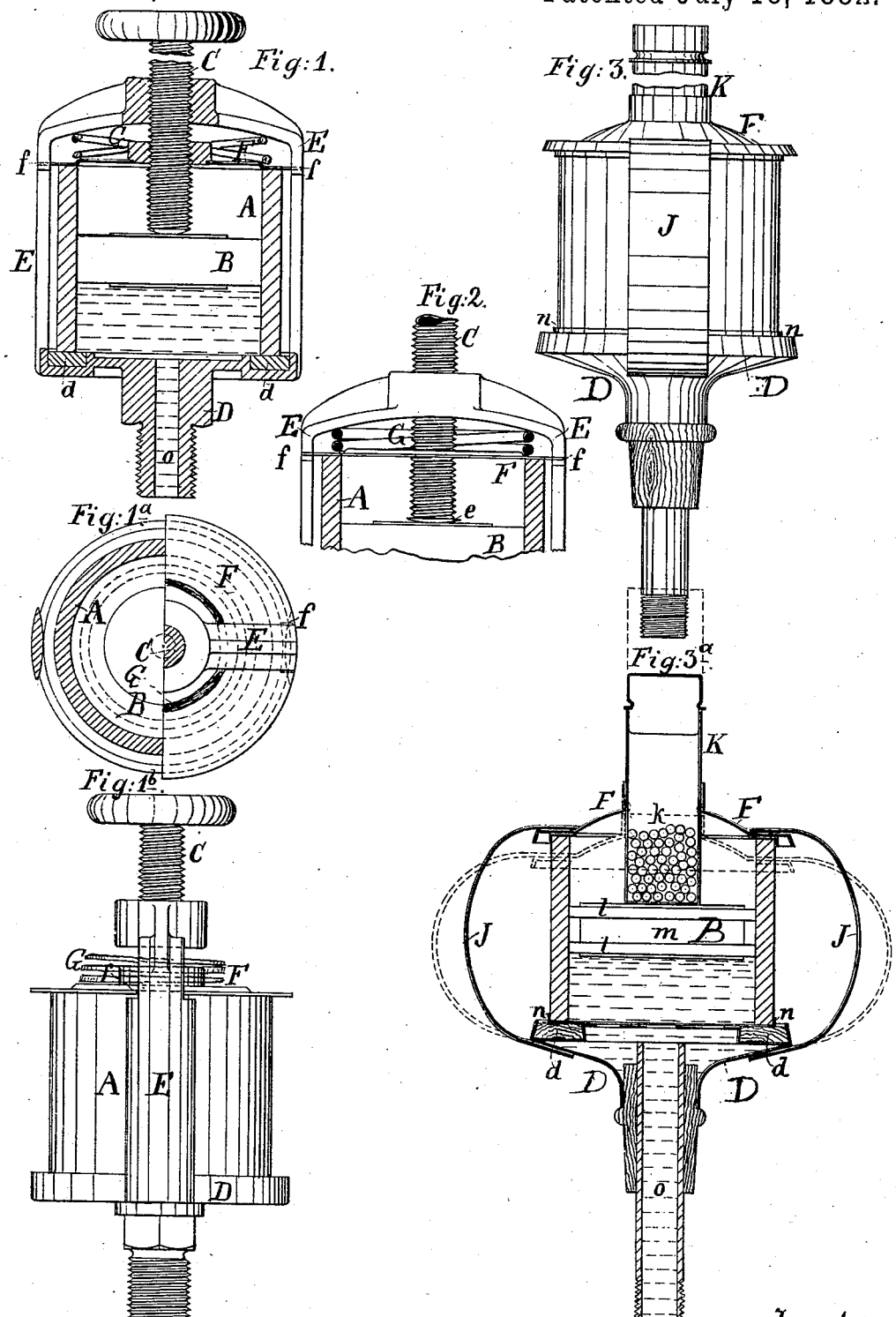

HANS REISERT, OF COLOGNE, PRUSSIA, GERMANY.

APPARATUS FOR LUBRICATING BEARINGS.

SPECIFICATION forming part of Letters Patent No. 261,256, dated July 18, 1882.

Application filed September 19, 1881. (No model.)

*To all whom it may concern:*

Be it known that I, HANS REISERT, of Cologne, in the Kingdom of Prussia, a subject of the Emperor of Germany, have invented certain new and useful Improvements relating to Apparatus for Lubricating Bearings, of which the following is a specification.

The invention relates to automatic lubricators for journals and bearings, and will be understood as set forth in the following specification and claims.

The accompanying drawings form a part of this specification, and illustrate what I consider the best means of applying the invention.

Figure 1 is a section taken vertically, showing a form of lubricator embodying some of the features of my invention; Fig. 1$^a$, a plan view, partly in section, of Fig. 1. Fig. 1$^b$ is an elevation of the same. Fig. 2 is a section of the same, showing a spring applied to this form. Fig. 3 is an elevation, and Fig. 3$^a$ is a vertical section of my invention as fully carried out, having side springs and a weighted piston.

Similar letters of reference indicate corresponding parts in all the figures.

The lubricator shown in Fig. 1 consists of a glass cylinder, A, open at either end, a symmetrically-shaped piston, B, a screw, C, supported by a frame, E, which is cast onto a circular base-plate, D, with packing-ring $d$, and a cover, F. The screw C works in a nut of the frame E. The cover F is likewise provided with a nut, and is guided by two notches, $f\,f$, engaging with the frame E, thus preventing it from turning round, but allowing an up and downward movement of a few millimeters. When the screw C is unscrewed so that it is not working in the nut of the cover F the cylinder A is pushed in between the frame E and under the cover F. In this position the thread in the nut of the cover is not the continuation of the thread in the nut of the frame, or of the screw C, but is turned round rather more than half the pitch of the screw. Consequently in screwing down the screw C the elastic cover F is pressed down half the pitch of the screw before it is able to enter the nut of the cover F. This arrangement not only serves to fix the cylinder, but also prevents the screw C from getting loose. The filling of the cylinder A is done by first slacking the screw C, which had been screwed quite down, until it is out of connection with the nut of the cover F. The cylinder A is then removed sidewise. In unscrewing the screw C the piston B remains at the lower part of the cylinder A, thus forming a bottom to it. The cylinder A, after being filled with any suitable lubricant of proper consistency, is turned upside down, and, with the piston B at the top, is pushed in between the base-plate D and the cover F. The screw C is screwed down upon the piston B, and thus presses the lubricant through an opening upon the rubbing-surfaces. The fixing and pressing of the cylinder A against the packing $d$ are performed by spiral spring, G, as shown. The screw C is furnished with a projecting piece, $e$, which, when the screw C is being unscrewed, lifts the cover F and spring G up, thus freeing the cylinder A, which can now be removed.

The devices necessary to make an automatic lubricator are shown in Figs. 3 and 3$^a$. The apparatus here shown is self-acting. The cover F and base D are connected by two springs, J J. For removing and filling the cylinder A the hollow bolt K is taken out, so as not to hinder the operation, turned upside down and stuck in again. The springs J J are compressed at right angles to the axis of the cylinder, thus freeing the latter. When filled, the cylinder is pushed in again between the base D and the cover F by compressing the springs J J, as before, and the hollow bolt K is put in its former position. The latter may, according to necessity, be filled with shot $k$, and if this weight for pressing down the piston should prove insufficient the bolt may be pressed down from time to time by hand. This piston B consists of a wooden layer, $m$, and two felt layers, $l\,l$, which are fastened to the former, thus preventing unnecessary friction and forming a good packing. To prevent the piston from falling out of the cylinder when the latter is being filled, two narrow metal edges, $n\,n$, are cemented onto either end of the cylinder A. As the glass cylinder may be filled alternately from either end, according to the respective position of the piston, this arrangement has the advantage of preventing the cylinder from becoming opaque through accumulation of grease in the empty part of the cylinder caused by leakage of the piston.

Certain features originally embraced in this application it is proposed to make the subject-matter of a separate application for patent.

I claim as my invention—

1. The lubricator described, having an open-ended removable cylinder and removable piston working therein, in combination with a cover adapted to be elevated or pressed down upon the cylinder by suitable holding means, substantially as set forth.

2. The combination, in a lubricator, of a fixed base, movable cover, interposed removable cylinder, elastic holding means therefor, substantially as described, and a loaded piston, said combination being arranged to force out the lubricating material by the gravity of the piston, as herein specified.

3. The combination of the lubricator-cylinder provided with a movable cover and a base, on which it sits, with a piston operating by its own weight to force out the lubricating material, and having a rod or cylinder extending above the cover of the lubricator to form a means for applying additional force at intervals, substantially as set forth.

In testimony whereof I have hereunto set my hand, at Cologne, Prussia, in the presence of two subscribing witnesses.

HANS REISERT.

Witnesses:
CARL ROCHELS,
DR. AUG. DAHMEN.